Figure 5:
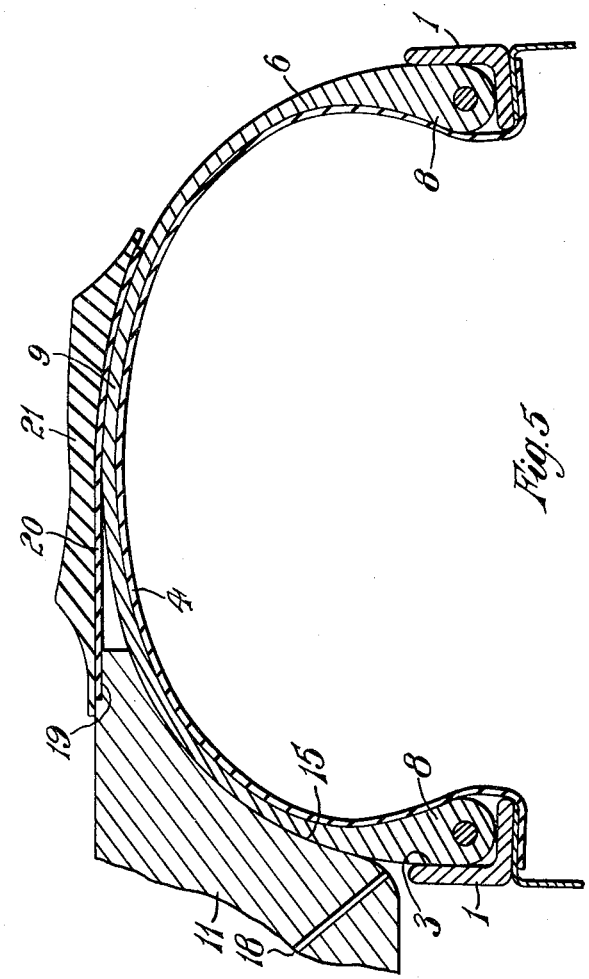

July 31, 1962 G. E. DRAKEFORD ETAL 3,047,450
MANUFACTURE OF PNEUMATIC TYRES
Filed Sept. 1, 1959 3 Sheets-Sheet 1
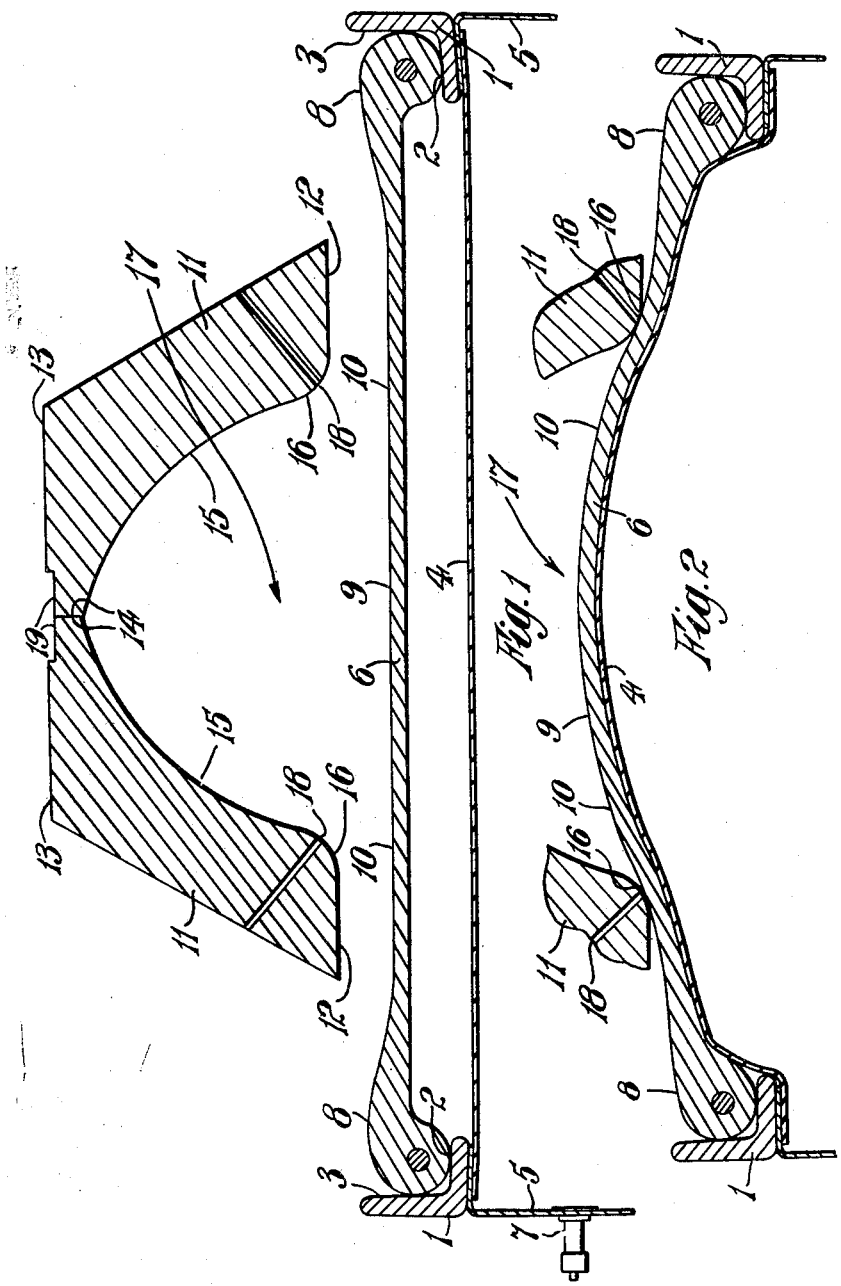
INVENTORS
George Edward Drakeford
Raymond Horgroor Magney
by Benj. T. Cruber
their attorney

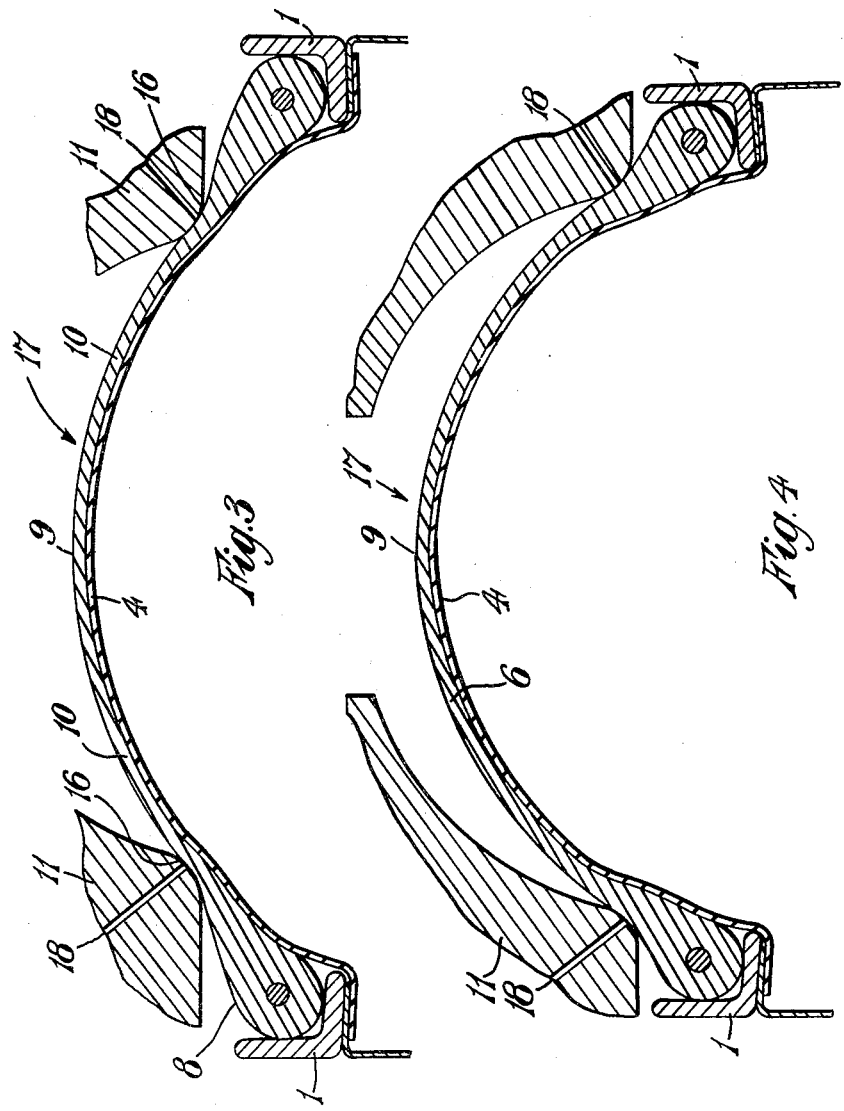

July 31, 1962 G. E. DRAKEFORD ETAL 3,047,450
MANUFACTURE OF PNEUMATIC TYRES
Filed Sept. 1, 1959 3 Sheets-Sheet 3

INVENTORS
George Edward Drakeford
Raymond Hargrove Hammain
by Benj. T. Charles
their attorney

United States Patent Office 3,047,450
Patented July 31, 1962

3,047,450
MANUFACTURE OF PNEUMATIC TYRES
George Edward Drakeford, Walmley, Sutton Coldfield, and Raymond Norgrove Manning, Erdington, Birmingham, England, assignors to Dunlop Rubber Company Limited, London, England, a company of Great Britain
Filed Sept. 1, 1959, Ser. No. 837,411
Claims priority, application Great Britain Sept. 3, 1958
6 Claims. (Cl. 156—110)

This invention relates to the manufacture of pneumatic tyres, particularly tyres in which the breaker strip, i.e. the reinforcement on the outside of the carcass below the tread, cannot be contracted or expanded to any substantial extent. Because of this property of the breaker strip such tyres cannot be manufactured in the conventional manner in which the tyre is completely built in a cylindrical or substantially cylindrical condition and is then compressed axially and expanded radially at its middle or crown part in a mould so as to take the desired toroidal shape.

It has been proposed to manufacture such tyres by building the carcass alone in the cylindrical or substantially cylindrical condition and constructing the breaker and tread substantially of their desired diameter in the finished tyre. The breaker and tread so assembled are positioned co-axially and symmetrically around the carcass which is then expanded at its crown portion until it contacts and adheres to the inside of the tread.

It is important that the carcass should be expanded uniformly and symmetrically and that the breaker strip should be placed symmetrically on the crown of the carcass. Any asymmetry can cause unbalance or abnormal stress in the tyre when in use, leading to early failure or unsatisfactory performance.

According to the present invention a method of shaping a pneumatic tyre carcass comprises contracting it axially and applying to it radially outward expanding force whilst restraining it to permit initially only its central region to expand, and varying the restraint as expansion proceeds to permit the region of expansion to increase towards the beads of the carcass.

Preferably the side regions of the carcass as they are expanded are caused to engage shaping surfaces for imparting to them the desired contour.

Further, according to the invention, apparatus for shaping a pneumatic tyre carcass comprises a pair of axially movable bead supports for carrying the carcass and means for expanding the carcass radially, and a pair of members adapted to engage the exterior of the carcass and confine its initial expansion to its central region, and movable axially outwardly simultaneously with axially inward movement of the bead supports to allow the carcass to expand gradually to its full expanded shape.

One embodiment of the invention will now be described by way of example, with reference to the accompanying drawings in which:

FIGURE 1 is a radial section of apparatus for shaping a tyre carcass, showing the carcass in its initial condition.

FIGURES 2, 3 and 4, similar sections to FIGURE 1, show the stages by which the carcass is expanded.

FIGURE 5, a similar section to FIGURE 1, shows the carcass in its final condition.

Figure 6:
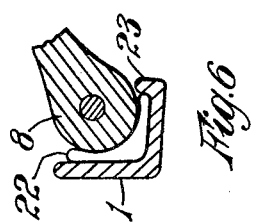

FIGURE 6 is a radial section through one of the bead support members showing a modification.

As shown in FIGURE 1 the apparatus comprises a pair of coaxial angle section annular bead support members 1, with circumferential surfaces 2 and confronting outwardly directed radial surfaces 3 remote from each other, the bead supporting members being movable, by mechanical means not illustrated, axially towards each other or apart symmetrically with respect to a central radial plane. Secured at its ends to, and extending between the bead supporting members 1 is a cylindrical inflatable diaphragm 4 of rubber or other resilient flexible material and each bead supporting member is closed by a circular sealing member 5 so as to form, with the diaphragm, an inflatable chamber. One of the sealing members 5 has a valve 7 for admitting fluid, such as air, under pressure for inflating the diaphragm.

The tyre carcass 6, which is mounted on bead support members 1, is in the substantially cylindrical condition in which it is built with beads 8, a crown portion 9 and axially outer regions 10 between the beads and the crown portion. The beads 8 seat against the surfaces 2 and 3 of the support members 1. As the bead support members 1 are located symmetrically to a central radial plane, the radial plane of symmetry of the carcass when so mounted will coincide with this radial plane. In the following description reference to a central radial plane will, therefore, also refer to the plane of symmetry of the carcass 6.

Coaxially surrounding the bead support members 1 is a pair of annular cuff members 11, with inner circumferential surfaces 12 and outer circumferential surfaces 13. Their inner circumferential surfaces 12 are of diameter slightly greater than the external diameters of the carcass 6 and the bead support members 1, and their outer surfaces 13 are of diameter substantially equal to the crown diameter of the carcass after shaping. Confronting annular surfaces 14 of the cuff members 11 extend radially inwardly from their external surfaces. The cuff members 11 are internally recessed towards their confronting surfaces 14, with walls 15, extending from the circumferential surfaces 12 to the annular surfaces 14, which are concavely curved complementary to the desired contour to which the carcass 6 is to be shaped. The radially inner portions of walls 15 merge into the inside circumferential faces 12 with convex surfaces 16. When the surfaces 14 abut each other on the central radial plane, at the innermost position of the cuff members 11, as shown in FIGURE 1, the walls 15 define between them an internal annular recess 17 of width at its mouth approximately equal to that of the crown portion 9 of the carcass 6, and a maximum diameter somewhat less than the desired diameter of the breaker in the finished tyre. Spaced air jets 18 are provided around the convex surfaces 16 for facilitating their sliding over the carcass 6, as will be described. Around the outer circumferential faces 13 of each cuff member 11 and adjacent to their annular surfaces 14 are annular seating recesses 19, the axial width of which is such that when cuff members 11 are moved axially apart to their final position, as shown in FIGURE 5, the overall width between their outer edges is such as to receive snugly a breaker 20. Since the recesses 19 are identical, and the cuff members 11 move symmetrically with respect to the central radial plane, the breaker 20 is centrally located with respect to the carcass 6 when so received. Also the outer circumferential faces 13 of cuff members 11 are preferably marked to indicate the position in which a tread strip (FIGURE 5) should be placed in order to ensure also its symmetrical location with respect to the central radial plane.

In use of the device a carcass 6 to be shaped is mounted as stated above in the bead support members 1 and the cuff members 11 are placed in their innermost position as shown in FIGURE 1. Fluid pressure is then applied to the valve 7 so as to expand the diaphragm 4 slowly, and at the same time the bead support members 1 are gradually moved axially towards each other forcing the beads 8 of the carcass 6 towards each other. The carcass is expanded radially outwardly by inflation and contacts the convex surfaces 16 of cuff members 11 which restrain its further expansion except at the crown portion 9 which is permitted to enter the annular recess 17. At this stage the cuff members 11 are gradually moved axially apart symmetrically so increasing the effective width of the recess 17 and permitting an increasing portion of the carcass 6 to expand into it, as shown in FIGURES 2, 3 and 4.

During the axial outward movement of the cuff members 11, inward movement of the bead support members 1 is continued and the outer regions 10 of the carcass 6 slide over the convex surfaces 16 of the cuff members so that the carcass gradually fills the recess 17 until in the final position, as shown in FIGURE 5, the axially outer ends of the concave walls 15 of the cuff members are in line with the radial surfaces 3 of the bead support members 1. At this stage the carcass 6 is fully expanded and lies closely against, and is shaped to its desired toroidal shape by the concave walls 15. During the whole operation, to facilitate the sliding of the walls of the carcass 6 over the convex surfaces 16, compressed air is supplied to the jets 18 so providing a cushion between the convex surfaces and the walls to minimise drag due to the tacky nature of the uncured carcass 6. In the final position, as shown at the left hand side of FIGURE 5, the crown 9 of the carcass 6 is exposed between the confronting annular surfaces 14 of the cuff members for receiving the breaker 20.

After so shaping the carcass, the breaker 20 is wound or placed around the cuff members 11, being received in and centrally located by their recesses 19 as described above and adheres to the exposed crown portion 9 of the carcass 6, and over it is wound or placed an unvulcanised tread strip 21 which is symmetrically positioned with respect to the central radial plane by aligning it with marks on the circumferential surfaces 13 as described above. Cuff members 11 are then withdrawn and the side portions of the breaker 20 and tread strip 21 are rolled or otherwise consolidated upon the carcass 6, as shown at the right hand side of FIGURE 5.

After consolidating the breaker and tread strip, side wall rubber is placed in position on the walls of the carcass 6 and the diaphragm is then deflated and the shaped carcass is removed from the apparatus and moulded and vulcanised in the normal manner.

For convenience the bead support members 1, the diaphragm 4 and cuff members 11 are preferably mounted so as to be bodily rotatable about their common axis, to facilitate the mounting of the breaker 20 and tread strip 21 upon the cuff members 11 and the consolidation of them to the carcass 6.

In a modification, shown in FIGURE 6, an annular rubber tube 22 is mounted in each support member 1 to facilitate the turning of the beads 8 as the carcass is shaped. Each tube 22 is inflated at a low pressure, for example approximately 3 lbs. per square inch and is retained in position by a short flange 23 at the innermost end of the respective support member 1. As the beads 8 turn during shaping of the carcass, the tubes 22 will roll beneath them, so reducing friction. The tubes 22 can also, if desired, form a pressure seal around the beads 8 so that the carcass 6 can be inflated directly and the diaphragm can be omitted, the bead supports in this case being discs for closing the bead apertures of the carcass, one of which is provided with an inflation valve.

Having now described our invention—what we claim is:

1. Method of shaping a pneumatic tyre carcass comprising the steps of contracting it axially and applying to it a radially outward expanding force whilst restraining it at circumferential zones spaced symmetrically from a plane transverse to its axis and midway between its beads to permit initially only its central region to expand radially outwardly, and varying the restraint as expansion proceeds to permit the region of radial expansion to increase progressively radially outwardly towards the beads of the carcass.

2. Method according to claim 1 wherein the side regions of the carcass as they are expanded are caused to engage shaping surfaces for imparting to them the desired contour.

3. Method according to claim 2 wherein the shaping surfaces provide the restraint.

4. Method according to claim 3 wherein the outward expanding force is applied by fluid pressure.

5. Method according to claim 4 wherein the outward expanding force is applied by means of a diaphragm which is inflated within the carcass.

6. Method according to claim 4 wherein the fluid pressure is applied directly to the carcass.

References Cited in the file of this patent

UNITED STATES PATENTS

| | | |
|---|---|---|
| 1,525,455 | Logan | Feb. 10, 1925 |
| 1,625,122 | Hopkinson | Apr. 19, 1927 |
| 2,542,871 | Johnson | Feb. 20, 1951 |
| 2,591,934 | Hawkinson | Apr. 8, 1952 |
| 2,699,198 | Balzhiser | Jan. 11, 1955 |
| 2,814,331 | Vanzo | Apr. 20, 1956 |

FOREIGN PATENTS

| | | |
|---|---|---|
| 598,692 | France | Oct. 2, 1925 |